No. 629,315. Patented July 18, 1899.
C. J. DORTICUS.
HOSE LEAK STOP.
(Application filed Mar. 1, 1898.)
(No Model.)
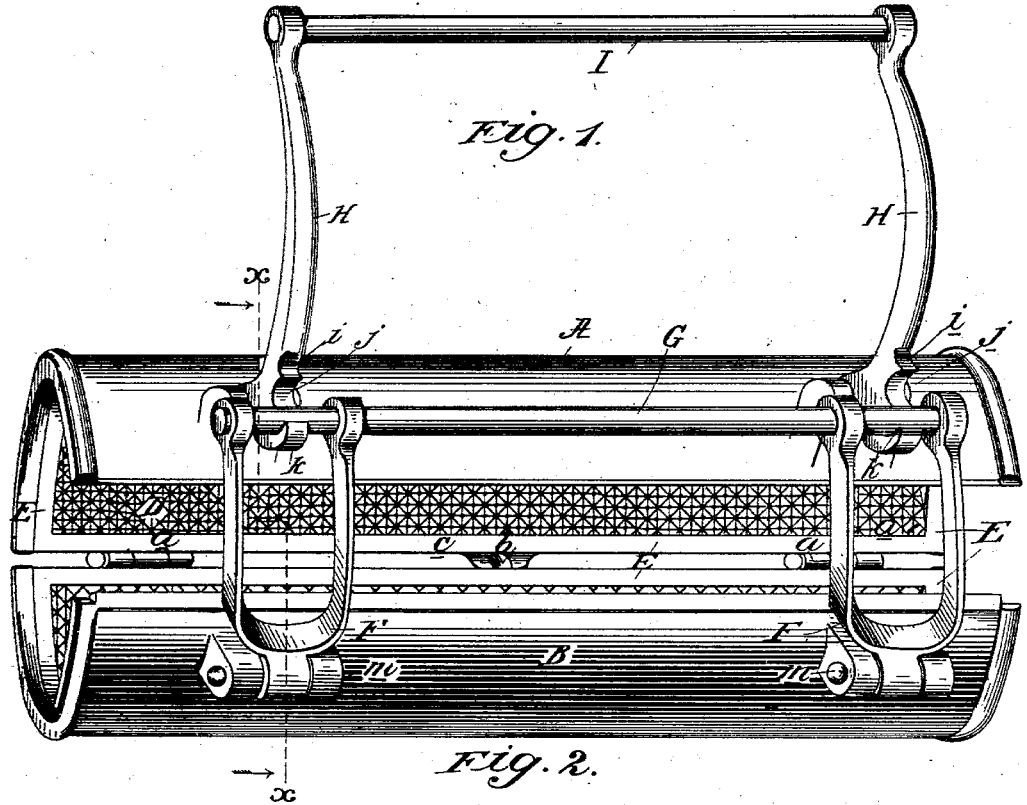
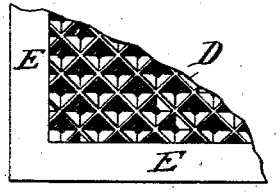
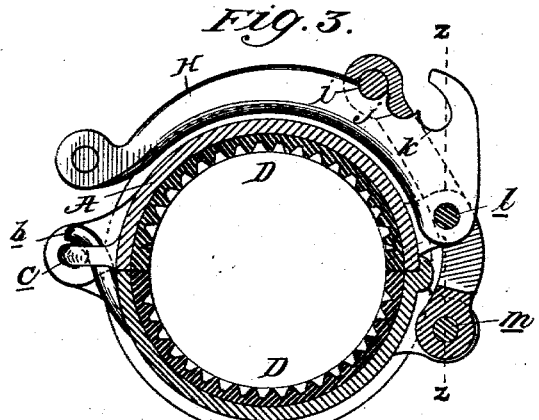
Witnesses
Edward T. Rowland
W. D. Neilley
Inventor
Clatonia J. Dorticus
By his Attorney
Andrew Wilson

UNITED STATES PATENT OFFICE.

CLATONIA JOAQUIN DORTICUS, OF NEWTON, NEW JERSEY.

HOSE-LEAK STOP.

SPECIFICATION forming part of Letters Patent No. 629,315, dated July 18, 1899.

Application filed March 1, 1898. Serial No. 672,126. (No model.)

*To all whom it may concern:*

Be it known that I, CLATONIA JOAQUIN DORTICUS, a citizen of the United States, residing at Newton, in the State of New Jersey, have invented certain new and useful Improvements in Hose-Leak Stops, of which the following is a specification.

My improvement relates to that class of hose-leak stops which are intended to be closed and locked about fire or other hose in order to stop the escape of the fluid therefrom, particularly in instances when the hose may have burst or sprung a leak when in actual use; and my improvements are directed to certain novel features of construction whereby the sufficiency of the hose-leak stop is greatly increased and its ready and positive operation secured.

In the drawings, Figure 1 is a perspective view of my improved hose-leak stop. Fig. 2 is a detail of the rubber packing. Fig. 3 is a cross-sectional view of the hose-leak stop, taken on the line X X of Fig. 1, with the lock in its tightest position.

Similar letters of reference designate similar parts in all the figures.

The body of the hose-leak stop is formed of two sections of metal A and B, which are secured together by hinges $a$ $a$ and by a hook and eye $b$ $c$. The interior of the sections A B is recessed, and therein is mounted a rubber packing D, which is formed with transverse ribs in one or more series, presenting depressions between them. In the drawings I have shown two series of ribs intersecting at right angles and forming between them diamond-shaped depressions; but I do not wish to limit myself to this particular form, as the ribs might be made transverse in a single series or otherwise inclined without departing materially from the spirit of my invention. Around the edge of the packing D is a solid border E, which is raised as high as the tops of the transverse ribs. The packing thus formed presents a large number of bearing-points to press against the inclosed hose, the points of support having between them depressions or recesses into which the water or other fluid escaping through the leak in the hose may enter, and the recesses or pockets forming a water-cushion and preventing the water from driving directly along between the outer surface of the hose and the inner surface of the leak-stop and squirting out beyond the edges of the stop, as is the case where smooth packing is used. Each of the ridges interposes a new barrier to the progress of any escaping water, and each of the recesses tends to break up and interrupt and stop the current, so that the escaping of water from beneath the stop and its driving in spurting streams therefrom is largely diminished, if not altogether stopped. Besides this, the ribs or projections present yielding contact-points with the hose, which permit of the leak-stop being forced very tightly against the hose, the elasticity of the rubber packing allowing the ribs to be compressed, and thereby permitting and allowing a wider range for the adjustment of the stop. This is important in connection with my locking mechanism, which is arranged to lock the sections of the leak-stop in varying positions, according to the size of the hose around which it may be clasped.

F F are V-shaped links pivoted to the section B and united at their outer ends by a common cross-bar G.

H H are hooked levers hinged to the section A and joined by a handle-bar I. The levers H are provided with a series of sockets $i$ $j$ $k$, which are adapted to grasp the bar G and to hold it while the levers are thrown back, thereby drawing the sections A and B together until the levers fall snugly against the sections A, when the bar G having been thrown beyond the line of the pivotal points $l$ $m$ the sections will be firmly locked together, and no interior strain will be sufficient to throw the lever back and unlock the stop. The sockets $i$ $i$ lock the leak-stop in its tightest possible position. To allow for some variation in the size of the hose by stretching or otherwise and to facilitate the adjustment of the leak-stop around burst and stretched hose, I provide several sockets, as $i$, $j$, and $k$, which will allow of the partial drawing together of the leak-stop in case it is not practicable to lock it tightly.

The bars I and G serve as handles by which the stop can be easily carried when not actually locked together.

By means of my improvements I secure a leak-stop which is simple, positive, and effective in operation, which is readily and securely locked upon different sizes of hose, which is provided with a large number of water-cushion recesses on its interior, thereby minimizing the squirting of water from beneath the stop and forming a large number of yielding pressure-points contacting with the inclosed hose.

By providing a multiplicity of elastic contact-points upon the inner face of the packing the hose is grasped with a semiyielding grip and not a rigid one. When the pressure within the hose is increased or diminished by the varying force of the stream of water, either by the pulsations of the engine or otherwise, the elasticity of the section of hose within the leak-stop is in measure preserved and the danger of a new break in the hose at a point adjacent to the leak-stop owing to rigidity of the section within the leak-stop is avoided. When the pressure is increased, more of the contact-points will be required to sustain the strain, while a less number will suffice as the pressure diminishes. The use of a soft pliable rubber packing insures this result.

The sections of the leak-stop may be locked together either by grasping the cross-bar G and drawing it, with its U-shaped links, over until it engages in the hooks in the levers H H and then forcing the bar down toward the leak-stop, thereby throwing down the levers H H past the locking-point, or the levers H H may be hooked upon the bar G and then thrown inward by grasping the handle-bar I until the locking-point is reached. Furthermore, the leak-stop may be unlocked by grasping either the bar G or the bar I and lifting them, as either of them will raise the connections out of locking engagement. The triplicate use of each of the bars G and I to either lock, unlock, or carry the leak-stop greatly increases the ease and rapidity of the use of the stop in practice, as the fireman need not pause in his work to change his grip from one part to the other of the device in his manipulation of it.

Having thus described my invention, what I claim, and desire to secure by Letters Patent of the United States, is—

1. The combination, with a hose-leak stop, of a rubber packing, provided with a multiplicity of intersecting ribs, integral therewith, and forming between them a multiplicity of recesses or chambers.

2. The combination, with a hose-leak stop of a rubber packing provided with a multiplicity of uniformly-distributed and intersecting ribs, integral therewith, upon the inner face thereof, forming between them a multiplicity of recesses or chambers.

3. The combination, with a hose-leak stop, of a rubber packing provided with a multiplicity of diagonally-intersecting ribs, integral therewith, upon the inner face thereof, forming between them a multiplicity of recesses or chambers, adapted to form water-cushions.

4. The combination, with a hose-leak stop, of a rubber packing provided with diagonally-intersecting ribs, integral therewith, uniformly distributed over its inner surface and forming between them depressions or recesses adapted to form water-cushions.

5. The combination, with each section of a hose-leak stop, of a rubber packing provided with a marginal rim or bead surrounding the same, and a plurality of ribs within such marginal rim, such rim and ribs being integral with the packing.

6. The combination, with a hose-leak stop, of a rubber packing provided with a multiplicity of elastic ribs or ridges upon its inner face and integral therewith.

7. The combination, with a hose-leak stop, formed of hinged sections, of a plurality of U-shaped links pivoted to one section, and provided with a cross-bar connecting said links, a plurality of hooked locking-levers pivoted to the other section, provided with a handle-bar connecting the same, and adapted to draw the U-shaped links simultaneously beyond the central line of said pivotal points and to hold the same locked.

8. The combination, with a hose-leak stop, formed of hinged sections, provided with a rubber packing having a multiplicity of yielding-pressure points upon the inner face, of a plurality of U-shaped links, pivoted to one section, and provided with a cross-bar connecting said links, a plurality of hooked locking-levers pivoted to the other section, provided with a handle-bar connecting the same, and adapted to draw the U-shaped links simultaneously beyond the central line of said pivotal points and to hold the same locked.

CLATONIA JOAQUIN DORTICUS.

Witnesses:
BOYD S. ELY,
HENRY HUSTON.